United States Patent [19]

Lim et al.

[11] Patent Number: 4,808,826

[45] Date of Patent: Feb. 28, 1989

[54] SMOOTH DOT DENSITY SPATIAL DISTORTION CORRECTION IN PHOTON IMAGING DEVICES

[75] Inventors: Chun B. Lim, Solon; Richard Chaney, Cuyahoga Falls; Felix Jih; Tim Johnson, both of Cleveland, all of Ohio; Steven E. King, Springfield, Va.

[73] Assignee: Technicare Corporation, Solon, Ohio

[21] Appl. No.: 849,324

[22] Filed: Apr. 8, 1986

[51] Int. Cl.$^4$ .......................... G01T 1/20; G06F 15/42
[52] U.S. Cl. ............................ 250/363 R; 364/413.24
[58] Field of Search .............. 250/363 SE, 363 S, 369; 364/414

[56] References Cited

U.S. PATENT DOCUMENTS 4,212,061  7/1980  Kroll et al. .................. 250/363 SE
4,611,283  9/1986  Lumelsky et al. ............ 250/363 SE
4,686,634  8/1987  Schrieber ........................ 364/523

Primary Examiner—Janice A. Howell
Assistant Examiner—Richard Hanig
Attorney, Agent, or Firm—Audley A. Ciamporcero, Jr.

[57] ABSTRACT

In scintillation cameras, spatial or linearity correction is accomplished utilizing a weighted average of correction vectors in the region of the apparent location of scintillation events. Such vectors are developed in a calibration step using a pinhole or slot apertured mask. On the fly, vectors beyond those next adjacent the apparent location are used for correction, which are constrained to exhibit continuity in both the functional value, and at a minimum the first derivative, but which may include continuity in higher order derivatives also. One such correction function, which insures continuity in both the functional value and its first derivative, is called a Hermite interpolation function.

7 Claims, 6 Drawing Sheets

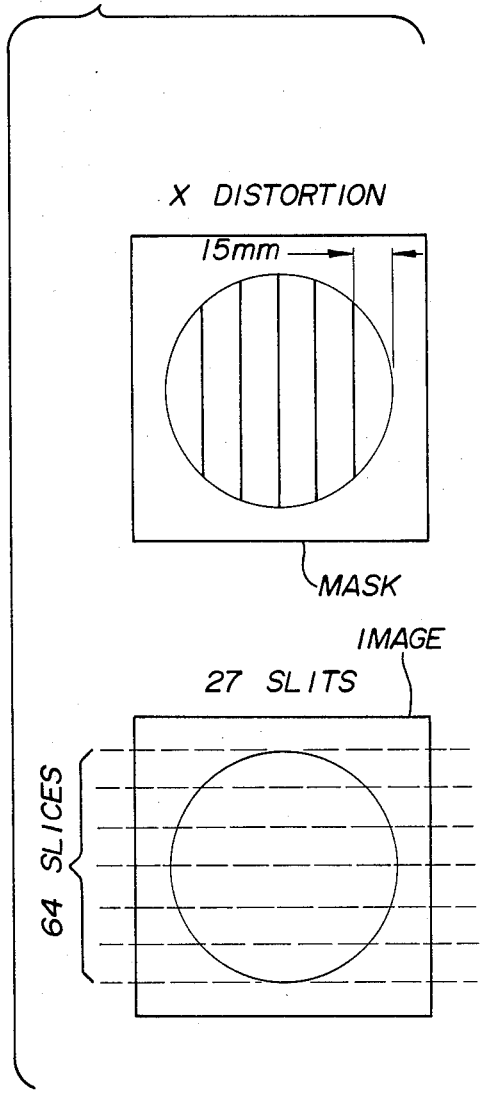
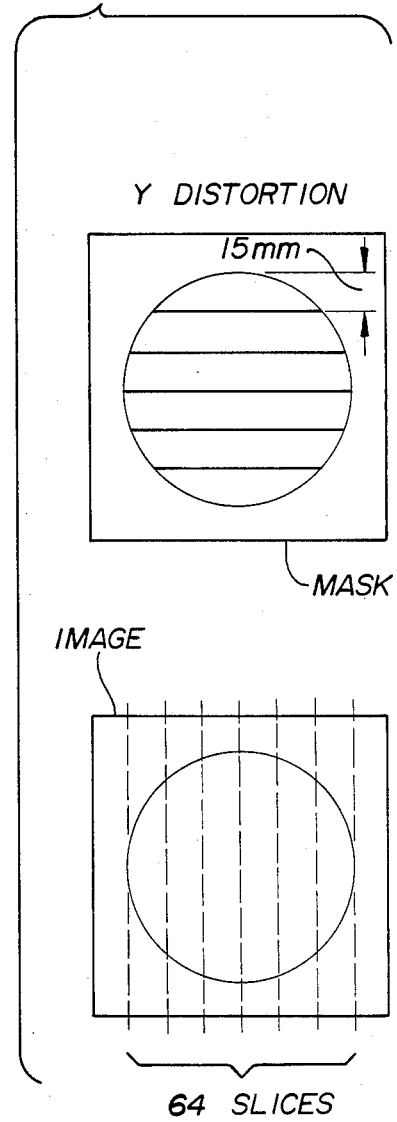
CAMERA FIELD ~ 400 mm

CAMERA SPATIAL DISTORTION

- CORRECTION TABLE LATTICE POINTS (ADC COORDINATES)
- HOLES OF LEAD CALIBRATION MASK
- DISTORTED HOLE CENTROID POSITIONS

- DISTORTED POSITION
- CORRECT POSITION

CAMERA ADC FRAME MATRIX
5 x 5 DISTORTED MATRIX POINTS
AND BILINEAR INTERPOSITION

SMOOTH DOT DENSITY SPATIAL DISTORTION CORRECTION IN PHOTON IMAGING DEVICES

FIELD OF THE INVENTION

This invention relates to photon imaging devices of the sort popularly known as nuclear, gamma, or scintillation cameras. More particularly, this invention relates to the eliminaton of artifacts therein.

BACKGROUND OF THE INVENTION

Nuclear imaging systems typically employ tissue or condition selective radioisotopes which are injected into the patient, and whose progress through the patient, or specific organs or systems in the patient, is monitored by a scintillation or gamma camera (also popularly known as an "Anger camera" after the pioneer thereof). The camera, typically suspended over the region in interest, possesses a scintillation crystal which converts collimated radiation from the isotope within the patient into a flash of light. A cluster of photomultiplier tubes (PMTs) is arrayed above the scintillation crystal, typically across one or more layes of glass or light transmissive plastic. Each tube converts the light received from the scintillation flash into an electrical signal. In turn, these electrical signals are processed in known fashion to locate the origin of the scintillation event (and hence of the nuclear event in the patient); and the aggregate of many such events is accumulated to produce an image.

Conventionally, the scintillation event is identified and located rather precisely by detecting the light intensity from the event at a plurality of next adjacent PMTs overlying the event. That is, since the PMTs accept light generally in proportion to the solid angle subtended by the PMT face relative to location of the scintillation event, such scintillation event in the crystal will produce a set of signals at overlying PMTs which is characteristic of the location of the event. Conventional analog and digital image processors are equipped to locate the event or "centroid", as the peak of a two-dimensional bell curve of intensity signals from the array of PMTs above the crystal. Also in conventional fashion, then, the actual image is displayed from the cumulative identification and location of the centroids.

As is known in the art, scintillation cameras experience inaccuracy (generally subdivided into energy, linearity, and flood constituents) for a number of reasons relatively inherent to the design. First, the discrete nature of the PMTs, as compared with the continuous nature of the crystal, ends an inherent degree of inaccuracy. Secondly, the tubes themselves are relatively large compared to the area which in the aggregate they monitor, contributing a degree of undersampling. Thirdly, even modern tube manufacturing and quality assurance procedures allow some degree of nonuniformity among individual PMT operating characteristics, thereby yielding a further source of inaccuracy. Finally, the variability in thickness of the glass layers separating the scintillation crystal from the PMTs produces a like gradient in tube response. Together, these factors lend a degree of inaccuracy in the process of locating the position of a scintillation event. Moreover, design approaches to compensate for one effect or another often entail tradeoffs regarding other functions and features of the system, and/or regarding overall system economics.

It is a primary object of the present invention to provide methods for correcting linearity or spatial distortion in scintillation cameras, that is, to provide methods for precisely locating the actual position of a nuclear event based on its apparent position as evaluated by the camera and system.

The prior art has allocated significant effort to correction of spatial or linearity distortion (along with the companion energy and flood corrections). In particular, there has existed in the prior art an appreciation that spatial distortion occurs, and that it is possible to calibrate individual cameras to compensate for the particular spatial distortion involved. In U.S. Pat. No. 3,745,345 to Muehllehner, the camera head is covered by a lead mask having a grid of pinhole apertures therethrough. A sheet source of radiation causes each aperture uniformly to illuminate the scintillation crystal therebelow, and the camera records the apparent location of the event in the crystal. The difference, of course, between the actual pinholes and the apparent events as located by the camera, is representative of spatial distortion at the respective locations on the camera face, and based upon this Muehllehner defines a correction factor for each such point in a stored array. Then, "on the fly", Muehllehner assembles an uncorrected digital image or map, the counts from which are then redistributed corresponding to the spatial correction factors in storage. There results a spatially redistributed map based on the stored correction factors. Muehllehner also teaches the use of the stored correction factors for correction of the points therebetween by interpolation, and the correction of each scintillation event individually in accordance with the stored factors.

U.S. Pat. No. 4,212,061 to Knoll et al. teaches another, somewhat more sophisticated method of spatial correction. For calibration, Knoll uses a lead mask having parallel slit apertures, through which the camera is exposed to a sheet radiation source, first with the mask in one orientation and then with the mask rotated by 90°. For each such exposure orientation, there is developed a series of transverse peak measurements at select intervals. An analytical polynomial expression is generated to represent event coordinates between calibration intervals, preferably by use of a cubic spline polynomial expansion. Each orientation exposure thus produces one of a pair of calibration coordinates, which in turn permit direct correspondence to associated time spatial coordinates. On the fly, each individual event is provided with correction based on the apparent location of the event, and the actual event location is determined by linear interpolation of the true coordinates associated with the stored correction factors.

Later, units commercially distributed by the assignee hereof under the trade designation "Omega" have utilized similar techniques to beneficial effect. In the Omega brand cameras, pinhole aperture masks are used in the calibration steps to develop a correction vector grid, which is stored in a look up table. On the fly, apparent events are corrected to the actual location by adding a correction vector which is determined by bilinear interpolation of the stored values.

The above described methods of the prior art have significant beneficial effect on spatial distortion in scintillation cameras. Nevertheless, systems which employ these methods still display substantial artifacts which in appearance can resemble a checkerboard style tonal gradient which overlays the imge in general correspondence with the location of the spatial linearity correction vectors.

It is an object of the principles of the present invention to provide spatial linearity correction while yet avoiding the artifacts heretofore inherent in the schemes of the prior art.

SUMMARY OF THE INVENTION

The principles of the present invention ar premised on the recognition that bilinear interpolation from a matrix or grid of spatial linearity correction vectors introduces artifacts due to slope discontinuity between respective adjacent regions; that is, on either side of the lines connecting next adjacent correction vectors.

Therefore, in one sense the principles of the present invention entail spatial correction for an apparent event location based not only on its immediately surrounding spatial correction vectors, but also upon select spatial correction vectors beyond the ones immediately adjacent the apparent location of the event. In some forms, accordingly, the principles of the present invention entail spatial distortion correction utilizing a weighted average of a substantial number (e.g. a dozen or more) of spatial correction vectors from the region of the correction vector matrix surrounding the apparent location of the event.

In another sense, the principles of the present invention entail on the fly spatial distortion correction based on a matrix of stored spatial correction values, but utilizing a correction function whose first derivative (i.e. slope) is continuous throughout the broader region of the apparent locaton of the event, that is, wherein the first derivative is continuous not only in the area bounded by next adjacent correction vectors (i.e. the "square" of correction vectors surrounding the event), but also through the regions on all sides of the area bounded by next adjacent stored correction vectors. In such a fashion, each spatial correction calculation, on the fly, is premised on a correction function which, unlike simple bilinear interpolation, takes account of an expanse of spatial distortion correction vectors beyond those which would be considered for basic interpolation. One such correction function, which insures continuity not only of the function itself, but also a select number of derivatives, is that known in the numerical analysis field as a Hermite function (sometimes also referred to as Hermite interpolation). In essence, by requiring continuity in both the function itself and its first derivative, the spatial dot density distribution in accordance with the present invention, after correction, avoids by definition the abruptness characteristic of the prior art, and hence likewise by definition avoids the sort of artifacts inherent in the prior art interpolation schemes.

In a preferred embodiment, each camera is calibrated for spatial distortion correction by exposure to a sheet radiation source through a dot apertured lead mask. The camera depicts an apparent location corresponding to the known, true location on the mask, and this disparity in each case permits development and storage of a grid-type matrix of distortion correction vectors. These vectors (e.g. a 128×128 grid) are placed in memory.

In such preferred embodiments, the actual spatial distortion correction occurs on an event-by-event basis, on the fly. That is, for each scintillation event, the centroid identifying the apparent location is determined in conventional fashion (e.g. weighted average of the light intensities observed by plural adjacent PMTs), and then the dozen stored correction vectors surrounding the apparent location (i.e. four each in the plux, plus y, minus x, and minus y directions) are processed for spatial distortion correction. These twelve points are utilized in accordance with a Hermite function to develop respective x and y spatial correction of the centroid to the correct location of the associated scintillation event. Throughout, the data is also processed as desired (which may include energy and flood corrections), whereupon images are accumulated, and the final image sequence is displayed.

DESCRIPTION OF THE DRAWINGS

FIGS. 2A and 2B show one prior art approach to the development of a spacial correction factor grid in scintillation cameras.

BEST MODE OF CARRYING OUT THE INVENTION

Figure 1A:
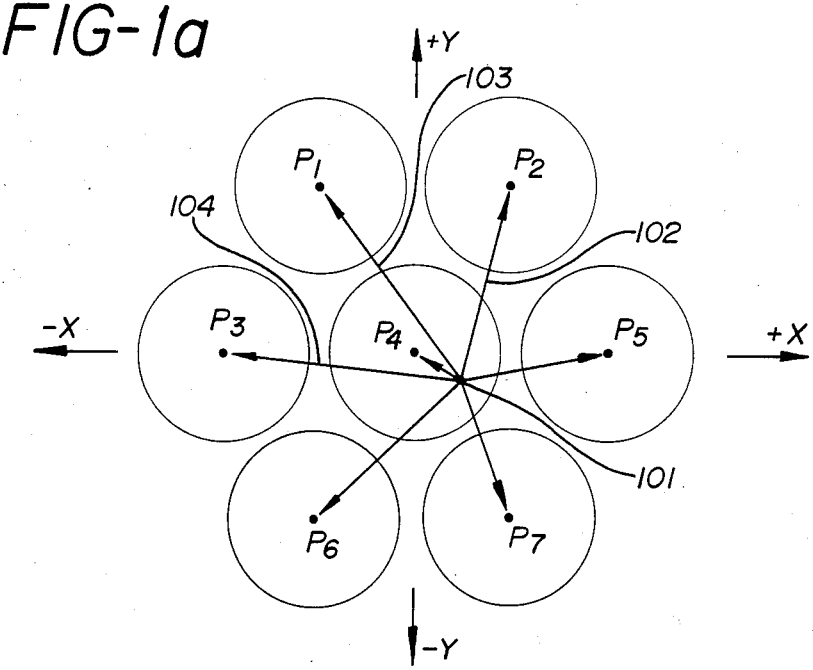
FIG. 1A shows a top view.
Figure 1B:
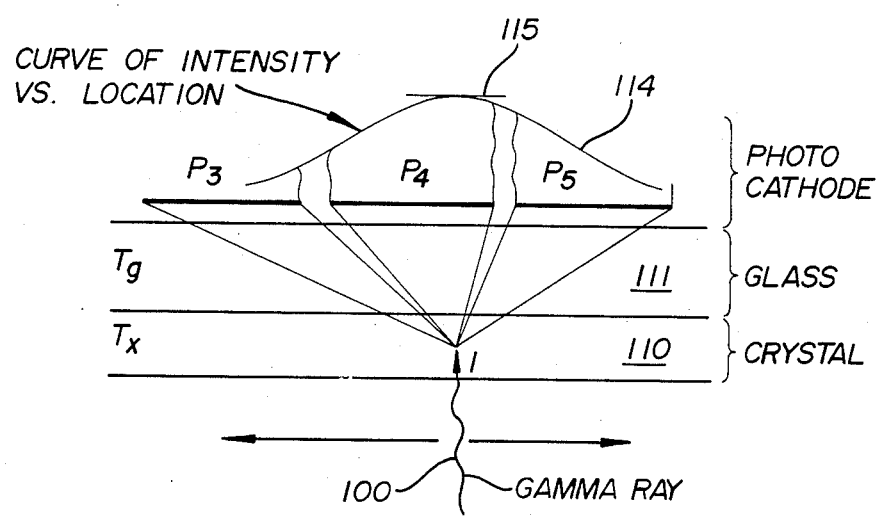
FIG. 1B shows a side view of the process of location of a centroid through the accumulation of weighted averages of energies received at photomultiplier tubes overlying the region of the event.

FIGS. 1A and 1B, when considered together, illustrate the basic precept of centroid location through the process of assembling weighted averages. In general, radidation from an isotope in the patient (i.e., gamma rays) issue forth in all directions, but the overlying, flat nuclear camera face locates them but two-dimensionally. As shown in FIG. 1b, generally normally incident gamma rays 110 (e.g., having passed through a collimator) enter a scintillation crystal, which emits light. The photocathodes of the photomultiplier tubes, P1, P2, etc., which overly the event, act as "eyes" and accept an amount of light generally proportional to the solid angle subtended by the photocathode relative to the point of emission 101 of the light in the crystal 110. The overall size of this angle will of course be dependent upon the thickness of the glass layer 111 intermediate the crystal 110 and the photomultiplier tubes P1, P2, etc.

FIG. 1B illustrates this light apportioning along the cross section x—x, while FIG. 1A translates these overall solid angles to respective intensity vectors. It will be appreciated that, assuming 100% of the light is taken up by the totality of photomultiplier tubes (an approximate but convenient assumption), the position or location of the original event may be developed through the assembly of a weighted average of the light intensities sensed at the respective tubes. Each such event occurs and is processed very rapidly (i.e., in the microsecond range), and each centroid processing step involves in effect finding the peak 115 of the two-dimensional bell curve 114 of intensity versus location. The aggregate of all centroids over a period of time corresponds to the cumulative emission events in the patient in the region below the camera. Since these events are roughly proportional to the uptake of radio isotope material by the organs or portions of the patient therein, such accumulation of centroid events resembles a mapping of concentration of the radio isotopes.

As stated hereinbefore, however, various factors more or less inherent to the design of the crystal-glass-photomultiplier configuration introduce a degree of error in the process of centroid location, which is commonly known as spatial distortion.

Reference is made to the previously cited United States Patents to Muehllehner and Knoll et al., which variously address the problem of spatial distortion. To the extent necessary to complete the disclosure herein, the Muehllehner and Knoll et al. patents are incorporated by reference herein.

As alluded to briefly hereinbefore, spatial distortion correction involves first the accumulation of a set or grid of correction vectors, which dictate the amount of correction called for at specific points or loci across the face of the camera. Then, as each event or each set of events is received and processed by apparent location, the correction vectors are utilized to develop points or sets of points with spatial distortion corrected (or at least approximately corrected), and hence which more properly represent the actual configuration of nuclear emissions and nuclear isotope concentrations in the patient therebelow. The principles of the present invention, after assembly of a grid of correction vectors, particularly relate to methods and apparatus for achieving this "on the fly" correction.

FIGS. 2A and 2B represent the development of a grid of correction vectors in accordance with the previously cited Knoll et al. patent. In accordance with the teachings of Knoll et al., a lead mask having parallel slots therein is positioned overlying the camera face, and is exposed to a sheet source or a distant point source of radiation. Thereafter, as shown in FIG. 2B, the mask is rotated by 90°, and the system is once again exposed. The combined exposures result in an aggregate view of x and y distortions, from which, in accordance with the teachings of Knoll et al., an orthogonal grid of correction vectors may be obtained, for example, utilizing cubic, spline-fit, polynomial curve-fitting routines, which in effect reconcile the distortions noted based on the respective x distortion and Y distortion procedures. Detailed such procedures are set forth extensively in Knoll et al., but for present purposes it suffices to say 64×64) which allow for spatial distortion correction at various points in the camera field.
various points in the camera field.

Figure 3:
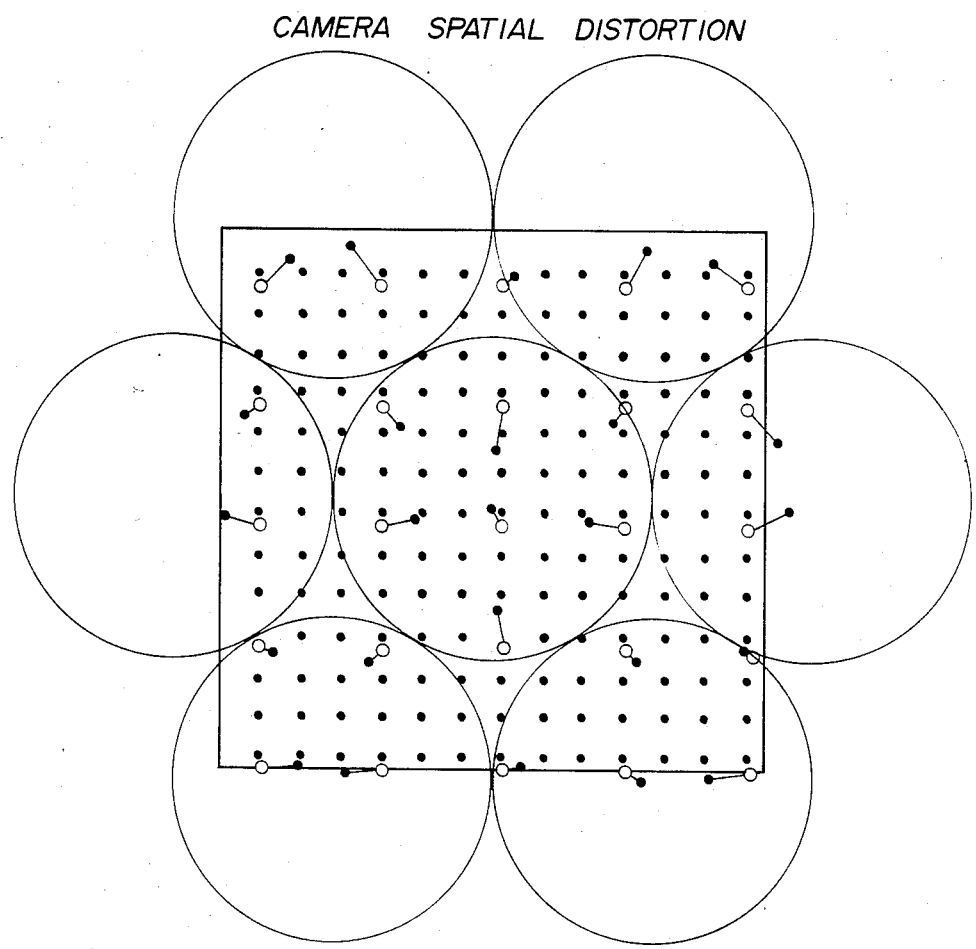
FIG. 3 shows another prior art approach to the development of a spacial correction gird in scintillation cameras.

FIG. 3 shows another prior art approach to the development of distortion correction vectors, which is in accord with the teachings set forth in the previously cited Muehllehner patent, and which in part is useful in accordance with the principles of the present invention (although, as desired, the approach of Knoll et al. could also be used to develop the factors). In FIG. 3, a lead callibration mask has a grid of pinholes therein. As is symbolically shown in FIG. 3, the grid (which in fact will conventionally be as large as the camera face) is exposed either to a sheet source or a remote point source, and a grid of spatial correction factors is assembled.

Whether the grid of spatial correction vectors is developed pursuant to the methodology described in conjunction with FIGS. 2A and 2B, that described in conjunction with FIG. 3, or some other version, the principles of the present invention entail use of these factors for "on the fly" corrections of events from an apparent location to a corrected, or true location. In preferred embodiments of the present invention, each individual event will be individually corrected, but it is feasible although less desirable to perform a correction a map at a time as taught in Muehllehner.

Figure 4:
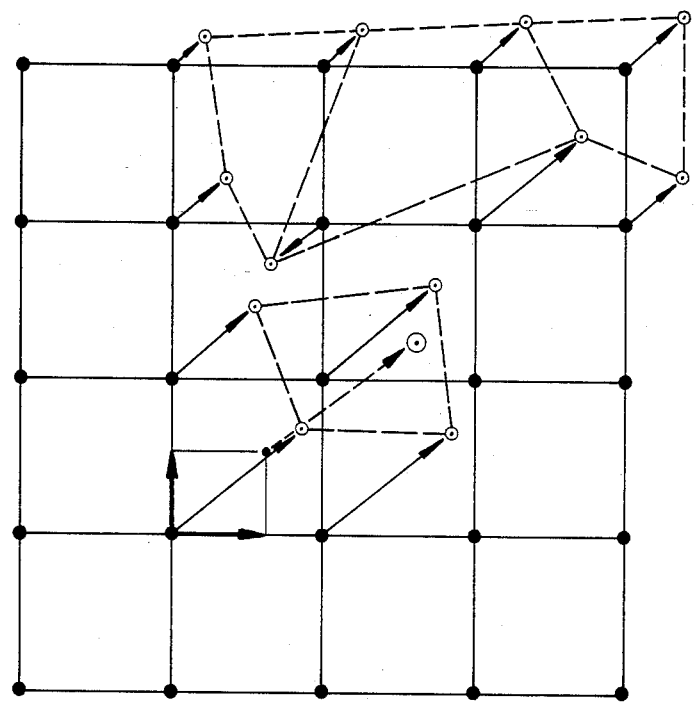
FIG. 4 shows a prior art bilinear interpolation correction based on the correction vector grid.

Probably the best and most accurate prior art "on the fly" correction is the one known as bilinear interpolation, generally as exemplified in FIG. 4. In FIG. 4, there is shown a partial grid of correction points along an orthogonal matrix. The correction vector at each point is shown. In some instances, these correction vectors will vary gradually from adjacent matrix point to adjacent matrix point, and in such events spatial distortion, the correction of which is the subject of the principles of the present invention, will be less severe. In some instances, however, such as those illustrated for emphasis in the upper portions of FIG. 4, widely divergent correction vectors will be exhibited even at next adjacent points in the matrix, and bilinear interpolation will result in severe artifacts at region boundaries, chiefly, as discussed hereinbefore, due to slope discontinuity in the point-to-point correction gradient.

Referring to the central portion of the FIG. 4 example, points 1 through 4 are shown, each occupying an intersection of the correction vector matrix, and each being assigned a vector representing a correction to be made at that point. Thus, any event apparently located at the point ($X_R$, $Y_R$) from matrix point 1 will in fact have been displaced from its true location. That is, based on each of the correction vectors at points 1 through 4, true locations for events at those points would be at the circles located next adjacent the termination of the vectors. Any events apparently located in the area between the correction factors would have been distorted by an amount intermediate those on the sides thereof. Therefore, for the point $X_R$, $Y_R$, interpolation of four vectors adjacent to the point $X_R$, $Y_R$ would result in an actual location of the event, as shown.

Generally, the theory has been set that such bilinear interpolation is useful to find the true location of the event based on the four correction vectors immediately surrounding the apparent location. This conventional wisdom fails to take account, however, that apparent locations in next adjacent "boxes" of the correction vector grid would, through bilinear interpolation, have the actual event manipulated on "surfaces" which might have widely divergent slope from one another, and although the interpolation "surfaces" would themselves involve no discontinuity, next adjacent surfaces might indeed (and in fact usually would) entail widely different slope from one another. To the extent that these slopes were radically divergent from one another, there would be entailed similarly divergent treatments, through simple or bilinear interpolation, of apparent locations nearby one another, but in fact just on opposite sides of matrix grid meridians. Consequently there would result substantially disparate treatments from the standpoint of distortion correction. The result, of course, would be a further distortion, or artifact generation. It is this problem to which the principles of the present invention are addressed.

Figure 5A:
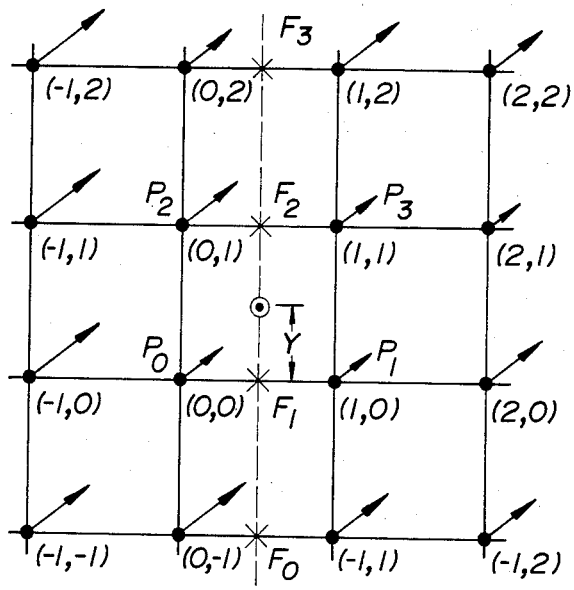
FIGS. 5A and 5B illustrate approaches to correction in accordance with the principles of the present invention.

Referring to FIG. 5A, there is shown a 4×4 portion of the matrix grid of exemplary correction factors on a nuclear camera. These 16 points therefore form nine "boxes", in any of which (as indeed is true throughout the camera) an event might apparently be located. For purposes of this discussion, an event is deemed to occur in the central "box" of the grid. If bilinear interpolation were to be utilized, only the correction vectors at the next four adjacent points would be utilized, that is, points (0,0), (1,0), (0,1), and (1,1). In accordance with the principles of the present invention, however, correction vectors from the points beyond these next adjacent are also to be utilized, that is, for example, points (−1,1), (−1,0), (0,−1) and so on around the grid. Optionally in accordance with the principles of the present invention, but not necessarily the best mode, points still further out could also be utilized, such as points (−1,2), (−1, −1), (2, −1) and (2,2), as well as points still further disparate. Thus, in one sense, the principles of the present invention might employ a weighted average of n correction vectors surrounding the apparent location of the event, where n is larger than 4 (the number used in the bilinear interpolation featured in the prior art). That is $$\overline{D} = \sum_{i=1}^{n} A_i \overline{C}_i$$

where $\overline{D}$ is the correction vector for the event, $A_i$ are weighting factors empirically derived, and $\overline{C}_i$ are the correction vectors. Referring to FIG. 5, in best modes n=12, including points (0, −1), (1, −1), (−1,0), (0,0), (1,0), (2,0), (−1,1), (0,1), (1,1), (2,1), 0,2), and (1,2).

In another aspect of the principles of the present invention, the function which is developed to incorporate contributions from these disparate points is one which maintains continuity of slope (i.e., first derivative) throughout the region of correction vectors utilized for the actual correction. In a preferred embodiment, for example, the 12 correction vectors immediately surrounding the apparent location (i.e., those previously specified in the weighted average method) are utilized to develop a function having such slope continuity, and hence to provide a spatial distortion correction which avoids the prior art problems occasioned in bilinear interpolation. Another way of considering this aspect is to specify correction based on the four adjacent points, provided slope continuity is maintained thereat. Such constraint in fact requires direct or indirect use of further remote points. A function known in numerical analysis as a "hermite function" and also as "hermite inerpolation" is one which possesses these traits by definition, and hence which is appropriate for use in accordance with the principles of the present invention.

There follows a series of derivations whereby the hermite interpolation techniques may be adapted to a series of point correction vectors such as described in FIG. 5. As shown, the essential contraints are to develop a function having the requisite continuity of slope at the n points. The following derivation, for convenience of understanding, proceeds from a one dimensional case to a derivation in two directions, and then to approximations which in accordance with the principles of the present invention permit simpler, more abbreviated calculation which nevertheles involves logical consistency with the slope continuity constraint.

A. Hermite interpolation

Consider a function f(x) which is known at n points, $a_1 \ldots a_n$, and its first derivative f'(x) which is known at r points such that $r \leq n$. Let y(x) be a (n+r−1) degree polynomial approximation to f(x) and E(x) be an error function, which allows f(x) to be rewritten as $$f(x) = \sum_{j=1}^{n} h_j(x) f(a_j) + \sum_{j=1}^{r} \overline{h_j(x)} f'(a_j) + E(x) \quad (1)$$

where the approximation y(x) is given by $$y(x) = \sum_{j=1}^{n} h_j(x) f(a_j) + \sum_{j=1}^{r} \overline{h_j(x)} f'(a_j) \quad (2)$$

and $h_j(x)$ and $\overline{h_j}(x)$ are both polynomials.

To insure exact equality between y(x) and f(x) at the tabulated points, sole for $h_j(x)$ and $\overline{h_j}(x)$ subject to the n+r constraints $$E(a_j) = 0 \text{ for } j = 1, \ldots, n \quad (3)$$

and $$E'(a_j) = 0 \text{ for } j = 1, \ldots, r.$$

which yields $$h_j(x) = \begin{cases} \{1 - (x - a_j)[1'_{jn}(a_j) + 1'_{jr}(a_j)]\} 1_{jn}(x) 1_{jr} & \text{for } j = 1, \ldots, r \\ 1_{jn}(x) P_r(x)/P_r(a_j) & \text{for } j = r+1, \ldots, n \end{cases} \quad (4)$$

$$\overline{h_j}(x) = (x - a_j) 1_{jn}(x) 1_{jr}(x) \text{ for } j = 1, \ldots, r \quad (5)$$

with $1_{jn}(x) = \dfrac{p_n(x)}{(x - a_j) p'_n(a_j)}$ for $j = 1, \ldots, n$ $1_{jr}(x) = \dfrac{p_r(x)}{(x - a_j) p'_r(a_j)}$ for $j = 1, \ldots, r$ and $p_n(x) = \prod_{i=1}^{n} (x - a_i) \quad p_r(x) = \prod_{i=1}^{r} (x - a_i)$ when r=n this may be simplified to $$h_j(x) = [1 - 2(x - a_j) 1'_j(a_j)] 1_j^2(x) \quad (6)$$

$$\overline{h_j}(x) = (x - a_j) 1_j^2(x) \text{ for } j = 1, \ldots, n$$

where $\mathbf{1}_{jn}(x) = \mathbf{1}_{jr}(x)$ has been replaced by $\mathbf{1}_j(x)$ to simplify the notation.

B. 2-pt Hermite Interpolation with Tabulated Slope

Consider the special case where n=r=2 and $a_1 = 0 \quad f(a_1) = f_1 \quad f'(a_1) = f'_1$ $a_2 = 1 \quad f(a_2) = f_2 \quad f'(a_2) = f'_2$ This allows f(x) to be approximated as $$f(x) y(x) = A(x)f_1 + B(x)f'_1 + C(x)f_2 - D(x)f'_2 \quad (7)$$

where
$A(x) = [1 + 2x](1 - x)^2$
$B(x) = x(1 - x)^2$
$C(x) = [1 + 2(1 - x)]x^2$
$D(x) = (1 - x)x^2$.

C. Generalization to 2 Dimensions

Referring to FIG. 5A consider four points $P_0$ to $P_3$ respectively located at (0,0), (1,0), (0,1) and (1,1), also let $f_0$-$f_3$ be the value of f(x,y) at points $P_0$-$P_3$ and f40

$f'_{0x}-f'_{3x}$ and $f'_{0y}-f'_{3y}$ be the x and y partial derivatives at each point.

The functional value at the two intermediate points $F_1$ and $F_2$ can be calculated by applying equation (7) to points $P_0-P_1$ and $P_2-P_3$.

$$F_1(x) = A(x)f_2 + B(x)f'_{2x} + C(x)f_1 - D(x)f'_{1x} \quad (9)$$

$$F_2(x) = A(x)f_2 + B(x)f'_{2x} + C(x)f_3 - D(x)f'_{3x}$$

To perform a final 2-pt Hermite interpolation in y between points $F_1$ and $F_2$, the y slope must be known at these points. This may be approximated by the linear interpolation of the y slopes at points $P_0-P_1$ and $P_2-P_3$.

$$y \text{ Slope at } F_1 = m_1(x) = (1-x)f'_{0y} + xf'_{1y} \quad (10)$$

$$y \text{ Slope at } F_2 = m_2(x) = (1-x)f'_{2y} + xf'_{3y}$$

Performing the final interpolation yields $$F(x,y) = A(y)F_1(x) + B(y)m_1(x) + C(y)F_2(x) - D(y)m_2(x) \quad (11)$$

D. 2-pt Hermite Interpolation with Approximte Slope

Returning to the one-dimensioned case, consider 4 points in a straight line, $P_0-P_3$ located at $x = -1, 0, 1$ and 2, repsectively. A 2 point Hermite interpolation is to be done between points $P_1$ and $P_2$. However, the slopes are not tabulated. Rather they are approximated by $$m_1(x) = (f_2 - f_0)/2 \text{ and } m_2(x) = (f_3 - f_1)/2 \quad (12)$$

which are the slopes for a 3 point quadratic fit about each point of interest.

This approximation for the slopes at points $P_1$ and $P_2$ may be substituted in equations (7) and (8) and like terms collected to yield a 4-pt interpolation formula $$f(x) \; A'(x)f_0 + B'(x)f_1 + C'(x)f_2 + D'(x)f_3 \quad (13)$$

where $$A'(x) = x(1-x)^2/2 \quad (14)$$

$$B'(x) = [1+2x](1-x)^2 + (1-x)x^2/2$$

$$C'(x) = [1+2(1-x)]x^2 + x(1-x)^2/2$$

$$D'(X) = -(1-x)x^2/2$$

E. Generalization to 2 Dimensions

Figure 5B:
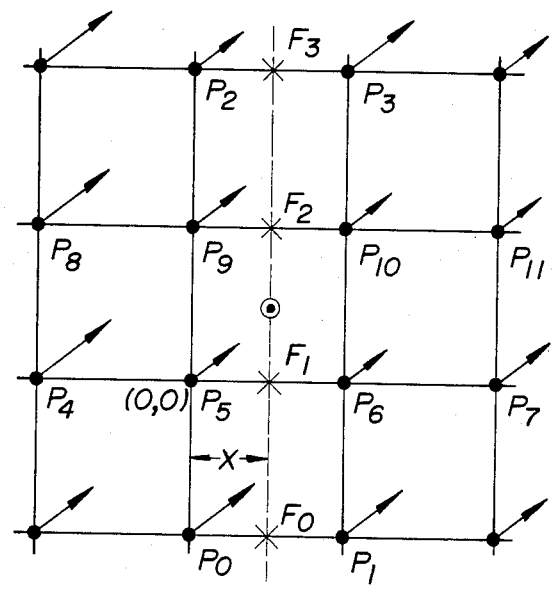

In FIG. 5B consider the 12 points $P_0-P_{11}$ spaced at 1 unit intervals located at (0, −1), (1, −1), (0,2), (1,2), (−1,0), (0,0), (1,0), (2,0), (−1,1), (0,1), (1,1), and (2,1) respectively.

The functional value at the two intermediate points $F_1$ and $F_2$ can be found bu two 4-point interpolations on points $F_4-F_7$ and $F_8-F_{11}$.

$$F_1(x) = A'(x)f_4 + B'(x)f_5 + C'(x)f_6 + D'(x)f_7 \quad (15)$$

$$F_2(x) = A'(x)f_8 + B'(x)f_9 + C'(x)f_{10} + D'(x)f_{11}$$

The functional values at the remaining two intermediate points, $F_0$ and $F_3$, are found by liner interpolation between points $P_0-P_1$ and $P_2-P_3$, respectively.

$$F_0(x) = (1-x)f_0 + xf_1 \quad (16)$$

$$F_3(x) = (1-x)f_2 + xf_3$$

which allows the final value to be determined by a 4-pt interpolation in y on points $F_0-F_3$.

$$F(x,y) = A'(y)F_0(x) + B'(y)F_1(x) + C'(y)F_2(x) + D'(y)F_3(x)$$

From the foregoing derivations, it will be seen that the Hermite function may be employed with various degrees of sophistication inorder to provide correction in accordance with the principles of the present invention. Slope continuity constraints by defintion relieve the artifact problems of the prior art, and tabulated slope or approximate slope options afford flexibility to the designer. In preferred embodiments, two-dimensional 2-pt Hermite interpolation with approximate slope is employed. Note that the approximate slope rationale may be followed in the x then y direction, or the y then x direction. In view of the slope approximation process, each approach will yield a somewhat different result, but neither forms a quantitatively better result than the other in any absolute sense.

Figure 6:
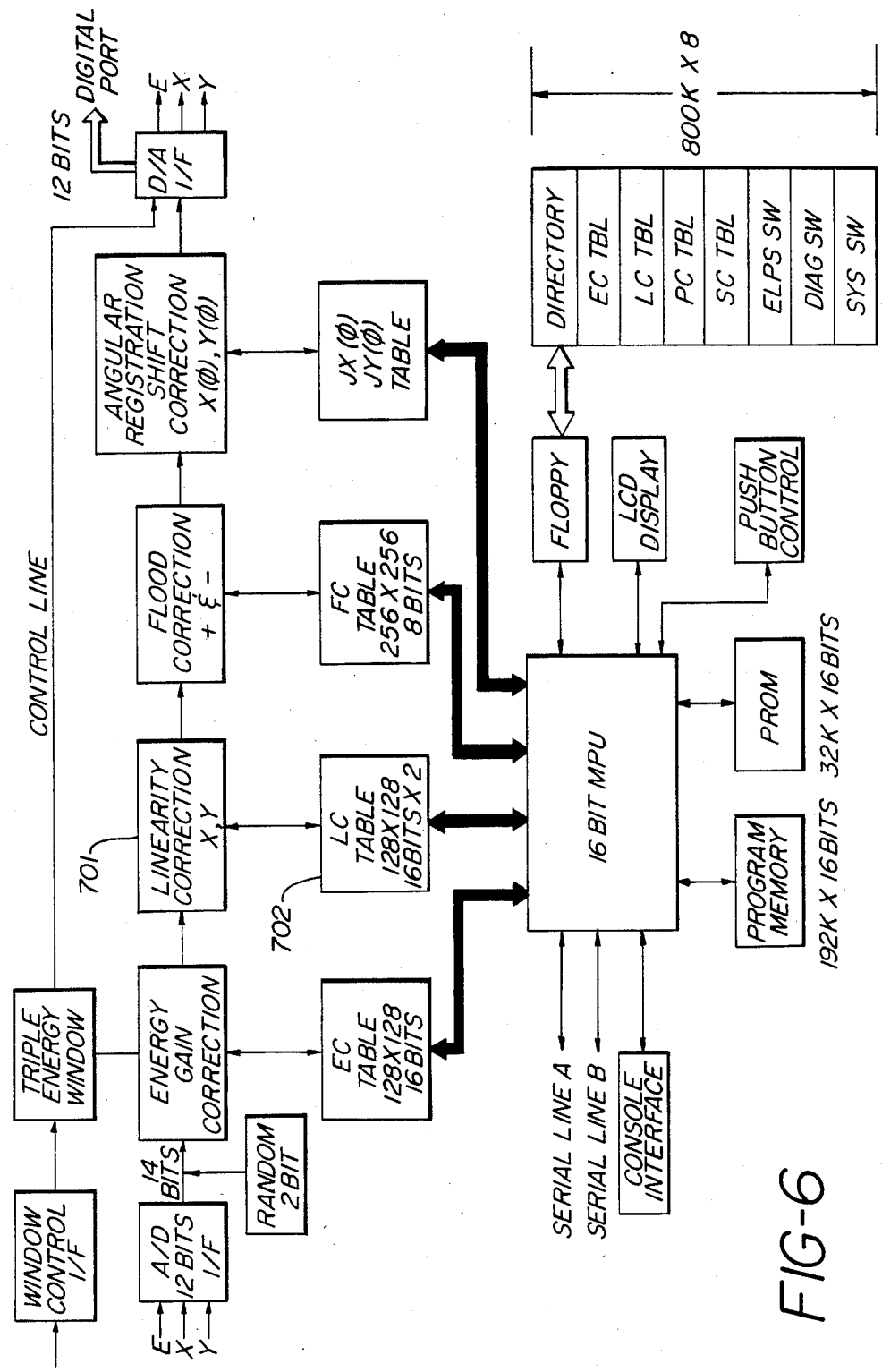
FIG. 6 shows a system suitable for the employment of the principles of the present invention.

FIG. 6 sets forth a system, in functional flow diagram fashion, suitable for practice of the principles of the present invention. The system of FIG. 6 is reproduced from a paper given at the 1984 IEEE Nuclear Science Symposium in Orlando, Fla. on Oct. 26, 1984. The paper was entitled "SPECTRAL—SPATIAL—SENSITIVITY DISTORTION TRENDS IN AN ACCURATE CORRECTION METHOD IN SCINTILLATION GAMMA CAMERAS", by S. King, F. Jih, C. Lim, R. Chaney, and E. Gray. In turn, that paper describes a system sold by the assignee hereof in the OMEGA* brand systems, captioned in particular the "SENTINEL" brand correction system. Spatial or linearity distortion in that paper is accomplished by bilinear or Lagrangian interpolation. In accordance with the principles of the present invention, the procedures set forth hereinbefore would be practiced, preferably in software fashion, at block 701, next following the energy gain correction but prior to the flood correction. The look-up table 702 is provided (and augmented, as necessary) in conjunction with the 16-bit microprocessor, for look-up data, including the correction vectors, tabulated slope values (if utilized), and the like. For purposes of completion of the instant disclosure, the King et al. paper is incorporated by reference herein. Note in the bibliography section thereof reference to Muehllehner et al. and Knoll et al. paper in correspondence with the Muehllehner and Knoll patents previously referenced herein.

The foregoing has set forth preferred and illustrative embodiments of the principles of the present invention, but it is to be understood that alternative embodiments will occur to those of ordinary skill in the art without departure from the spirit or scope of the principles of the present invention. For instance but without limitation, this disclosure has utilized correction "vectors", but such usage is not meant to exclude scalar factors, should such be adequate to meet the needs of those of ordinary skill.

We claim:

1. In an imaging system employing a scintillation camera, a method of correcting for spatial distortion comprising the steps of:
   (a) establishing a grid of spatial correction vectors at predetermined loci over the field of the camera; and
   (b) during operation, applying a spatial correction for each scintillation event by developing a correction function having continuity of slope in a region surrounding the apparent location of the event, characterized in that said region extends beyond the set of correction vectors next adjacent the apparent location of the event.

2. A method as described in claim 1 wherein said correction function, is a polynominal function fit to all said adjacent pairs and having continuity in a given predetermined number of derivatives.

3. In an imaging system employing a scintillation camera, method of correcting for spatial distortion comprising the steps of:
   (a) establishing a grid of spatial correction vectors at predetermined loci over the field of the camera; and
   (b) during operation, applying a spatial correction for each scintillation event by developing a correction function having the continuity of slope in a region surrounding the apparent location of the event, characterized in that said region extends beyond the set of correction vectors next adjacent the apparent location of the event, wherein said applying step is further characterized by defining a Hermite correction function over the region defined by at least twelve correction vectors surrounding the apparent location of the event.

4. A method as described in claim 3 wherein said defining step compries accumulating a grid of correction function slope parameters at select points over said field, and maintaining said parameters together with said spatial correction vectors for purposes of applying said correction.

5. A method as described in claim 3 wherein said defining step comprises, for each event, estimating a correction function slope at the locus of each given spatial correction vector based on select spatial correction vectors adjacent said given correction vector.

6. In an imaging system employing a scintillation camera, a method of correcting for spatial distortion comprising the steps of:
   (a) establishing a grid of spatial correction vectors at predetermined loci over the field of the camera; and
   (b) during operation, applying a spatial correction for each scintillation event by developing a correction function having the continuity of slope in a region surrounding the apparent location of the event, characterized in that said region extends beyond the set of correction vectors next adjacent the apparent location of the event, wherein said applying step is further characterized by defining a Hermite correction function over the region defined by at least two correction vectors each in the positive and negative horizontal and vertical directions from said apparent location.

7. In scintillation camera systems, a method of linearity distortion compensation comprising the steps of:
   (a) for each camera, developing a grid of correction vectors as factors for predetermined locations on the camera face, and storing said factors as a table in operative association with the camera; and
   (b) during operation of said camera,
      (i) detecting the apparent location of a given scintillation event;
      (ii) retrieving from said table a plurality of said factors in the region of said apparent location, said region extending beyond those of said factors which are next adjacent the apparent location;
      (iii) developing a correction function, based on said retrieved factors, which is continuous and which has no slope discontinuities in said region;
      (iv) identifying a corrected location for said apparent location based on said correction functions; and
   (c) producing a display from accumulation of events at said corrected locations.

* * * * *